(12) United States Patent
Yamada

(10) Patent No.: US 8,871,674 B2
(45) Date of Patent: Oct. 28, 2014

(54) RADIOACTIVE-SUBSTANCE-ABSORBENT, RADIOACTIVE-SUBSTANCE-ABSORBENT PRODUCTION DEVICE, AND BAG UNIT

(71) Applicant: Seibu Newspaper Company, Tokyo (JP)

(72) Inventor: Masao Yamada, Tokyo (JP)

(73) Assignee: Seibu Newspaper Company (JP)

( * ) Notice: Subject to any disclaimer, the term of this patent is extended or adjusted under 35 U.S.C. 154(b) by 106 days.

(21) Appl. No.: 13/657,056

(22) Filed: Oct. 22, 2012

(65) Prior Publication Data
US 2013/0109902 A1 May 2, 2013

(30) Foreign Application Priority Data

Oct. 31, 2011 (JP) .................................. 2011-238814
Feb. 27, 2012 (JP) .................................. 2012-039827

(51) Int. Cl.
| | |
|---|---|
| *B01J 20/00* | (2006.01) |
| *B01J 20/18* | (2006.01) |
| *B01J 20/28* | (2006.01) |
| *G21F 9/00* | (2006.01) |
| *B01J 20/24* | (2006.01) |
| *B01J 20/16* | (2006.01) |
| *B02C 23/36* | (2006.01) |

(52) U.S. Cl.
CPC ................. *G21F 9/001* (2013.01); *B01J 20/18* (2013.01); *B01J 20/28028* (2013.01); *B01J 20/24* (2013.01); *B01J 20/165* (2013.01); *B02C 23/36* (2013.01); *B01J 2220/46* (2013.01); *B01J 20/2805* (2013.01); *Y10S 588/901* (2013.01)
USPC ................................ 502/401; 588/1; 588/901

(58) Field of Classification Search
USPC ........................................ 502/401; 588/1, 901
See application file for complete search history.

(56) References Cited

U.S. PATENT DOCUMENTS 5,414,196 A    5/1995  Jennings

FOREIGN PATENT DOCUMENTS

| JP | 5-215896 A | 8/1993 |
|---|---|---|
| JP | 6-43292 A | 2/1994 |
| JP | 11-264896 A | 9/1999 |
| JP | 2006-98360 A | 4/2006 |

*Primary Examiner* — Edward Johnson
(74) *Attorney, Agent, or Firm* — Schwegman Lundberg & Woessner, P.A.

(57) ABSTRACT

By fibrillated cellulose fibrillated in fiber form and humidified as a water permeable polymeric substance of botanical origin and a radioactive-substance-absorbent obtained by mixing with zeolite as a granulated inorganic porous crystal, radioactive substances released and spilled in a accident etc. in a nuclear facility etc. may be efficiently and easily collected and removed at a low cost.

14 Claims, 11 Drawing Sheets

RADIOACTIVE-SUBSTANCE-ABSORBENT, RADIOACTIVE-SUBSTANCE-ABSORBENT PRODUCTION DEVICE, AND BAG UNIT

CROSS-REFERENCE TO RELATED APPLICATIONS

This application is based upon and claims the benefit of priority of the prior Japanese Patent Application No. 2011-238814, filed on Oct. 31, 2011 and No. 2012-039827, filed on Feb. 27, 2012, the entire contents of which are incorporated herein by reference.

FIELD

The present invention is related to: a radioactive-substance-absorbent for efficiently collecting and removing radioactive substances which have been released or spilled due to an accident etc. such as nuclear facility etc.; a production device for the absorbent; a decontaminating method for removing the radioactive substances using the radioactive-substance-absorbent; and a bag unit for storing the radioactive-substance-absorbent.

BACKGROUND

When an accident occurs in a nuclear facility (nuclear power plant, fuel reprocessing plant, fuel producing plant, uranium conversion and enrichment plant, laboratory, etc.), not only the workers in the facility, but also the people in the vicinity may me exposed to a large amount of radiation. Actually, relating to the accident at the Three Mile Island nuclear power plant and the accident at the Chernobyl nuclear power plant, there are reports about a large number of creatures including animals and plants which have been exposed to radiation.

It is also estimated that, in the 2011 accident at the Fukushima No. 1 nuclear power plant, a large amount of radioactive substances have spilled in air or releases to the sea or rivers. Especially, the radioactive substances which have been released in air fall on the ground by a rainfall. Then, the radioactive substances which have fallen on the ground form adhere to the ground, and form contaminated soil.

It is necessary in the process of decontaminating radioactive substances to lower the contamination level down to a specified reference or less, and to consider how to reduce the amount of secondary waste which occurs with the process.

Conventionally, as a method of removing the radioactive substances which are released from a nuclear facility, the method of organically removing the radioactive substances using activated carbon etc. (for example, refer to the patent document 1). In addition, there is also a method proposed to remove radioactive substances by sprinkling powdered activated carbon and zeolite on a contaminated place, mixing the powder with earth and sand, and processing the mixture in sandbag form.

In addition, there is a technique disclosed for filtering radioactive waste and then performing the waste by an ion-exchange process (for example, refer to the patent document 2).

Additionally, as a decontaminating method on a cement-like surface, a technique of removing radioactive substances by the effect of microbes (for example, refer to the patent document 3).

Also a method and a device for chemical decontamination using dicarboxylic acid have been proposed (for example, refer to the patent document 4).

Patent Document 1: Japanese Laid-open Patent Publication No. 11-264896
Patent Document 2: Japanese Laid-open Patent Publication No. 6-43292
Patent Document 3: Japanese Laid-open Patent Publication No. 5-215896
Patent Document 4: Japanese Laid-open Patent Publication No. 2006-98360

SUMMARY

However, the above-mentioned conventional technologies have the problem that it is difficult to collect soil after decontamination. Furthermore, since a large amount of non-contaminated soil is included in the collected soil, the decontaminating operation is not efficiently performed. There also is the problem that the cost of decontamination is high.

The present invention has been developed to solve the above-mentioned problems, and aims at providing: a radioactive-substance-absorbent for efficiently and easily collecting and removing at a low cost the radioactive substances released or spilled due to an accident etc. of a nuclear facility etc.; a product device for the absorbent; a decontaminating method for removing radioactive substances using the radioactive-substance-absorbent; and a bag unit storing the radioactive-substance-absorbent.

The present invention has adopted the following configuration to solve the above-mentioned problems.

That is, according to an aspect of the present invention, the radioactive-substance-absorbent of the present invention is obtained as a mixture of a water permeable polymeric substance of botanical origin fibrillated in fiber form and humidified and a granulated inorganic porous crystal.

In addition, it is preferable that the radioactive-substance-absorbent according to the present invention is a substance including one or two, or more mixtures of paper, pulp, wood, bamboo, hemp, grass, and seed husk.

It is also preferable that the radioactive-substance-absorbent according to the present invention is zeolite whose inorganic porous crystal has an ion-exchange function.

Furthermore, it is preferable that the radioactive-substance-absorbent has a weight ratio of about 10:9:1 (10 to 9 to 1) among the water permeable polymeric substance, water, and the inorganic porous crystal.

It is also preferable that the radioactive-substance-absorbent according to the present invention is an absorbent obtained by mixing one or two, or more of an inorganic compound, an organic compound, silver, copper, ultramarine blue (Persian blue) and adding starch etc. as an adhesive in the mixture.

Furthermore, according to an aspect of the present invention, the bag unit of the present invention stores the above-mentioned radioactive-substance-absorbent in each of two or more bag-shaped storage units.

According to an aspect of the present invention, the radioactive substance absorbing filter of the present invention decontaminates foods by putting the above-mentioned radioactive-substance-absorbent in a bag and submerging the bag containing the foods in a container of water.

According to an aspect of the present invention, the plant growing soil of the present invention includes the above-mentioned radioactive-substance-absorbent and is used for growing plants.

Also according to an aspect of the present invention, the radioactive substance absorbing filter of the present invention is configured by putting the above-mentioned radioactivesubstance-absorbent in a reticulated container of a petroleum resin including a hydroxyl group resistant to corrosion from seawater.

Furthermore, according to an aspect of the present invention, the decontaminating method of the present invention arranges the above-mentioned radioactive-substance-absorbent on permeable non-woven fabric on the surface of contaminated soil including radioactive substances, and sprinkles water on the absorbent, thereby allowing the radioactive-substance-absorbent to collect the radioactive substances and decontaminating the contaminated soil.

In addition, it is preferable that the decontaminating method of the present invention allows the radioactive-substance-absorbent configuring the above-mentioned radioactive substance absorbing filter to collect radioactive substances and decontaminate a fluid containing the radioactive substances by passing the fluid through the above-mentioned radioactive substance absorbing filter.

Also according to an aspect of the present invention, the radioactive-substance-absorbent production device of the present invention includes: a tank containing a substance including a mixture of one or two, or more mixtures of any of paper, pulp, wood, bamboo, hemp, grass, and seed husk; a water supply device for supplying water into the tank; a rotating edge for rotating and driving by a motor to fibrillate the substance into fiber form in the tank; and an inorganic porous crystal supply device for supplying granulated inorganic porous crystal in the tank. The substance is fibrillated into fiber form using the rotating edge in the tank, and humidified by supplying the water by the water supply device, and the inorganic porous crystal supply device supplies the inorganic porous crystal, thereby producing a radioactive-substance-absorbent as a mixture of the humidified substance and the inorganic porous crystal.

According to a further aspect of the present invention, the bag unit of the present invention includes two or more connected bag-shaped storage units each of which stores a water permeable polymeric substance of botanical origin which is fibrillated in fiber form and a dry-type radioactive-substance-absorbent mixed with a granulated inorganic porous crystal.

It is preferable that the bag unit according to the present invention includes the water permeable polymeric substance containing one or two, or more mixtures of any of paper, pulp, wood, bamboo, hemp, grass, and seed husk.

It is preferable that the bag unit according to the present invention includes the inorganic porous crystal which is zeolite having an ion-exchange function.

Furthermore, it is preferable that the bag unit according to the present invention have each of the storage units separated from one another.

It is also preferable that the bag unit according to the present invention has the weight percentage of about 10:1 between the water permeable polymeric substance and the inorganic porous crystal.

DESCRIPTION OF THE EMBODIMENTS

The embodiments of the present invention are described with reference to the attached drawings.

Described first is the radioactive-substance-absorbent to which the present embodiment is applied.

Figure 1:
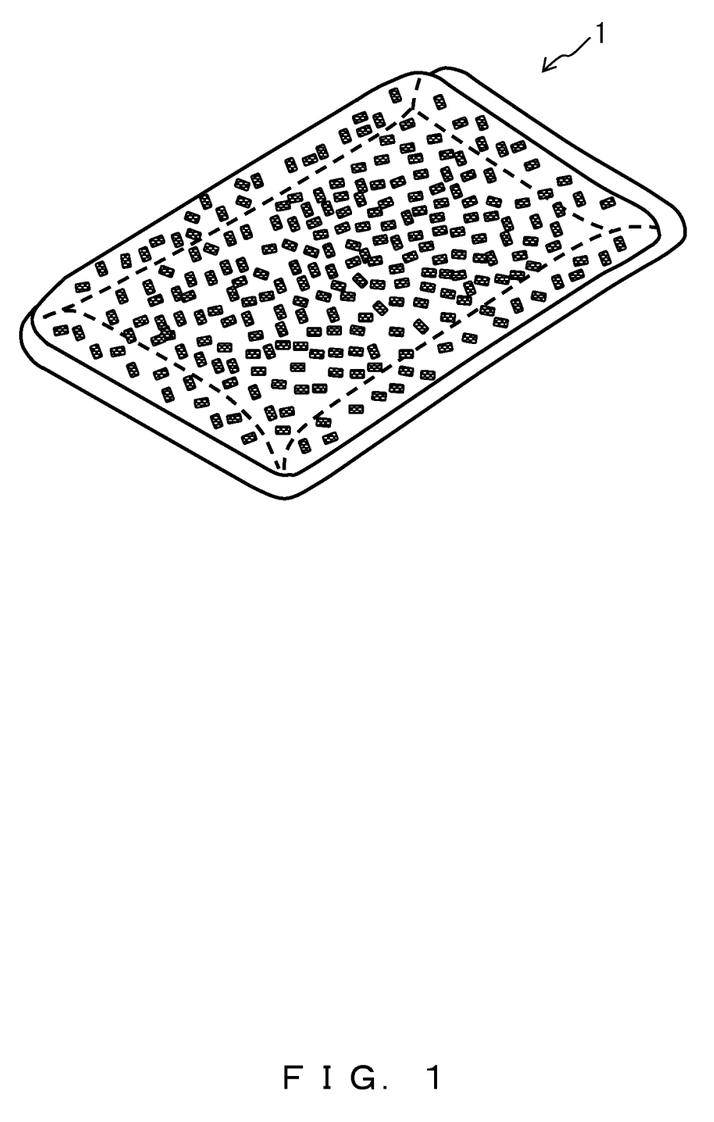
FIG. 1 illustrates a bagged radioactive-substance-absorbent.

FIG. 1 illustrates a bagged radioactive-substance-absorbent.

In FIG. 1, a radioactive-substance-absorbent 1 is put in a bag of nonwoven fabric or in fiber form having water permeability and water flow. The radioactive-substance-absorbent 1 is made of any of paper, pulp, wood, bamboo, hemp, grass, and seed husk as a water permeable polymeric substance, or a mixture of them by fibrillating any of them or a mixture of them into fiber and fibrillated cellulose, humidifying the fiber by a specified amount of water, so that the water content (dry-based content) of about 100% is obtained. The radioactive-substance-absorbent 1 is a mixture of the humidified water permeable polymeric substance of botanical origin and a granulated inorganic porous crystal. The preferable mixed inorganic porous crystal is about 5% (weight %) of humidified water permeable polymeric substance.

The inorganic porous crystal is, for example, zeolite having an ion-exchange function. Zeolite is hydrated aluminosilicate including alkali metal or alkaline earth metal. Since zeolite has fine holes in a crystal structure, it has an ion-exchange function, an adhesive function, a catalyst function, etc. By the functions, it has the so-called zeolite effects of such as the effects of adjusting the humidity, the adhesion and decomposition of an organic substance, the decomposition of formaldehyde, an antiodor treatment, the decomposition of NOx and SOx, etc. The zeolite effects selectively take in radioactive substances such as cecium (Cs), strontium (Sr), etc.

Described next is a radioactive-substance-absorbent production device for producing the above-mentioned radioactive-substance-absorbent 1.

Figure 2:
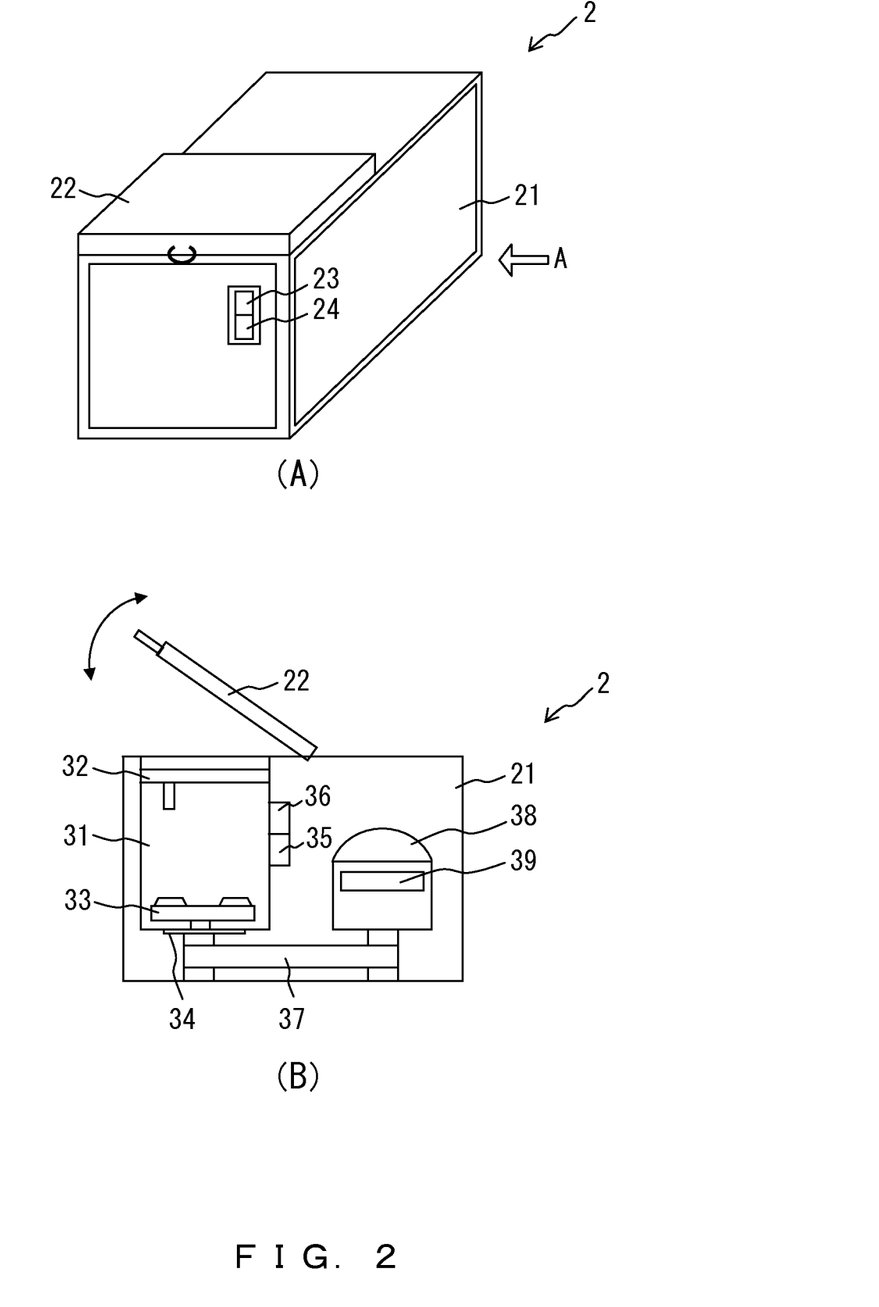
FIG. 2 is a radioactive-substance-absorbent production device.

FIG. 2 is a radioactive-substance-absorbent production device;

In FIG. 2, part (A) is a perspective view of a radioactive-substance-absorbent production device 2, and part (B) is a sectional view of the radioactive-substance-absorbent production device 2 viewed from the direction of the arrow A in part (A).

The radioactive-substance-absorbent production device 2 is configured by a body unit 21, an outer cover 22, a power supply switch 23, and a start switch 24.

The body unit 21 includes: a fibrillation tank 31 for storing a water permeable polymeric substance such as paper, pulp, wood, bamboo, hemp, grass, and seed husk; an inner cover 32 provided between the outer cover 22 and the fibrillation tank 31; a rotating edge 33 having application edges and crushing and fibrillating a water permeable polymeric substance by allowing the water permeable polymeric substance to touch rotating edges; a mass sensor 34 provided at the lower potion of the fibrillation tank 31 and measuring the mass of the water permeable polymeric substance which enters the fibrillation tank 31; a water supply device 35 for supplying a specified amount of water to the fibrillation tank 31 based on the measurement result of the mass sensor 34; an inorganic porous crystal supply device 36 for supplying a specified amount of granulated inorganic porous crystal such as zeolite etc. to the fibrillation tank 31; a motor 38 for rotating and driving the rotating edge 33 through a belt 37; and a control device 39 for controlling the rotation speed of the motor 38.

The outer cover 22 moves in the direction of the arrow, and the inner cover 32 is an interlocking unit. The control device 39 controls the rotation speed of the rotating edge 33, the rotating time, the water to be supplied, and the amount of the inorganic porous crystal based on the type, the combination, and the amount of the water permeable polymeric substance.

The above-mentioned radioactive-substance-absorbent production device 2 crushes the water permeable polymeric substance using the rotating edge 33 in the fibrillation tank 31, and fibrillates the subject into fiber. Then, the substance in fiber form is humidified by supplying water by the water supply device 35, and the humidified water permeable polymeric substance is mixed with the inorganic porous crystal by supplying the inorganic porous crystal by the inorganic porous crystal supply device 36, thereby producing the radioactive-substance-absorbent 1 as described above with reference to FIG. 1.

Described next is the producing step of the radioactive-substance-absorbent 1 by the radioactive-substance-absorbent production device 2.

Figure 3:
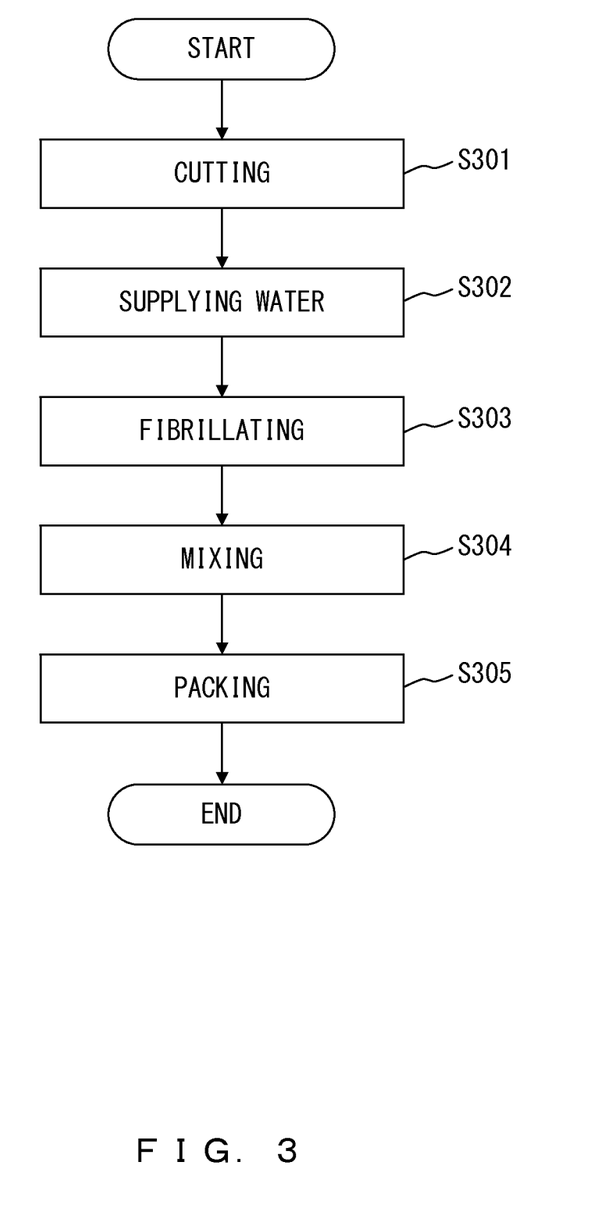
FIG. 3 is a flowchart of a process of producing the radioactive-substance-absorbent.

FIG. 3 is a flowchart of a process of producing the radioactive-substance-absorbent 1.

The radioactive-substance-absorbent 1 is produced by the 39 executing the control program prepared in advance. The operation of the control program may be adjusted by inputting the information in advance such as the type, the combination, etc. of the water permeable polymeric substance. An example is described below.

First, the operator of the radioactive-substance-absorbent production device 2 puts a water permeable polymeric substance such as paper, pulp, wood, bamboo, hemp, grass, and seed husk, closes the inner cover 32 and the outer cover 22, and then turns on the power supply switch 23 and the start switch 24.

Then, in step S301, the mass sensor 34 measures the amount of the water permeable polymeric substance in the fibrillation tank 31, and rotates the rotating edge 33 at a specified rotation speed for a specified time according to the measurement result and the information about the water permeable polymeric substance input in advance. Thus, the water permeable polymeric substance is cut. For example, in the case of pulp as compared with wood, the rotating edge 33 is programmed so that it may rotate at a lower rotation speed and in a shorter time.

When the cutting in step S301 is completed, the water supply device 35 supplies a specified amount of water in step S302 with respect to the measured amount of the measured water permeable polymeric substance to the fibrillation tank 31. In this case, the water supplied to the fibrillation tank 31 is poured so that the water permeable polymeric substance may be easily fibrillated, and it is appropriate that the amount of water does not overflow even after compressing the fibrillated fiber material with normal human power.

For example, if the water permeable polymeric substance is configured by 250 g of used copy paper, 250 g of newspaper, 250 g of leaflets, and 250 g of magazines, that is, a total of 1 kg of used paper, then the amount of supplied water is 0.6 through 1.3k which may be fibrillated, and especially 0.8 through 0.9 kg of the paper may be the most preferably fibrillated. For example, if the amount of supplied water is 0.8 kg, then the water content of normal used paper is 5 (through 6). Therefore, the ratio of the water permeable polymeric substance to water is about 10:9 ((1−0.05):(0.8+0.05)=10:8.947 . . . ). Therefore, the water content of the fibrillated fiber material is about 90% ((0.8+0.05)/(1−0.05)×100−89.47 . . . ). If the amount of supplied water is small, dust and static electricity may be generated, no fiber form is made, or fiber may be coarse. On the other hand, if the amount of supplied water is too large, the fiber may take form of lump, thereby failing in fibrillation.

Thus, by adding an appropriate amount of water to the water permeable polymeric substance, the fibrillation may be realized without effluent of waste. That is, the water permeable polymeric substance may be fibrillated at a yield of 100%. In addition, the dust and static electricity which may be generated during fibrillation may be suppressed.

When the water supply in step S302 is completed, the rotating edge 33 is rotated for a specified time at a specified rotation speed in step S303 based on the amount of the measured water permeable polymeric substance, the information input in advance about the water permeable polymeric substance, and the amount of supplied water. In this case, the rotation speed of the rotating edge 33 becomes gradually higher with the lapse of time. And after a specified time has passed, the edge may be rotated at a specified rotation speed, or may be rotated constantly at a specified rotation speed. In addition, the rotation speed of the rotating edge 33 may be set as optionally increased or decreased. Furthermore, the direction of the rotation of the rotating edge 33 may be changed (inversely rotated).

When the fibrillation in step S303 is completed, the inorganic porous crystal supply device 36 supplies a specified amount of processing to the fibrillation tank 31 based on the measured water permeable polymeric substance and the amount of supplied water in step S304. For example, an average of granule diameter of 400 μm of granulated zeolite is supplied. In this case, it is appropriate that the inorganic porous crystal poured into the fibrillation tank 31 has a weight ratio of about 10:9:1 (through 5) among the water permeable polymeric substance, water, and the inorganic porous crystal. Then, the rotating edge 33 is rotated at a specified rotation speed for a specified time. In this case, the rotation speed and time of the rotating edge 33 is lower and shorter than the case of the cutting in step in S301 and the fibrillation in step S303, and the inorganic porous crystal may be mixed with the water permeable polymeric substance. Thus, the humidified water permeable polymeric substance is mixed with the inorganic porous crystal, thereby producing the radioactive-substance-absorbent 1.

Then, in step S305, the radioactive-substance-absorbent 1 mixed in step S304, is put in a bag of nonwoven fabric or in fiber form having water permeability and water flow when formed in a specified size. By bagging and packing the radioactive-substance-absorbent 1, the radioactive-substance-absorbent 1 may be easily handled.

Described next is the method of using the radioactive-substance-absorbent 1 produced as described above.

The easiest method is to lay the radioactive-substance-absorbent 1 produced as described above on the surface of the contaminated soil including radioactive substances. Thus, the radioactive-substance-absorbent 1 may be allowed to collect radioactive substances and decontaminate the contaminated soil. In addition, by arranging the radioactive-substance-absorbent 1 on the surface of the contaminated soil and sprinkling water over the radioactive-substance-absorbent 1, the radioactive-substance-absorbent 1 may be easily fit into the contaminated soil.

Since the radioactive-substance-absorbent 1 is humidified, it is easily fit into the contaminated soil, especially the contaminated soil which sufficiently contains rain water. The radioactive-substance-absorbent 1 may be easily fit into even dry contaminated soil after the subsequent rainfall and sprinkled water etc. It is easy to confirm the absorption of radioactive substances by actual sprinkle.

When the radioactive-substance-absorbent 1 is arranged on the contaminated soil, the bag may be used as described above, or the radioactive-substance-absorbent 1 may be arranged on the nonwoven fabric or a sheet in fiber form having water permeability and water flow without a bag. If a bag is used, the radioactive-substance-absorbent 1 may be easily collected after the radioactive-substance-absorbent 1 captures the radioactive substances. Without a bag, the radioactive substances may be fixed on the soil. Since the radioactive-substance-absorbent 1 is of botanical origin, it may be collected and then incinerated, thereby stored in a low bulk state. In addition, the radioactive-substance-absorbent 1 may be mixed with an adhesive, and compressed in board form.

Furthermore, the above-mentioned radioactive-substance-absorbent 1 may be put in a bag, and submerged with foods in a container containing water, and thus used as a radioactive substance absorbing filter for decontaminating the foods.

Described next is a method of effectively using the radioactive-substance-absorbent 1.

Figure 4:
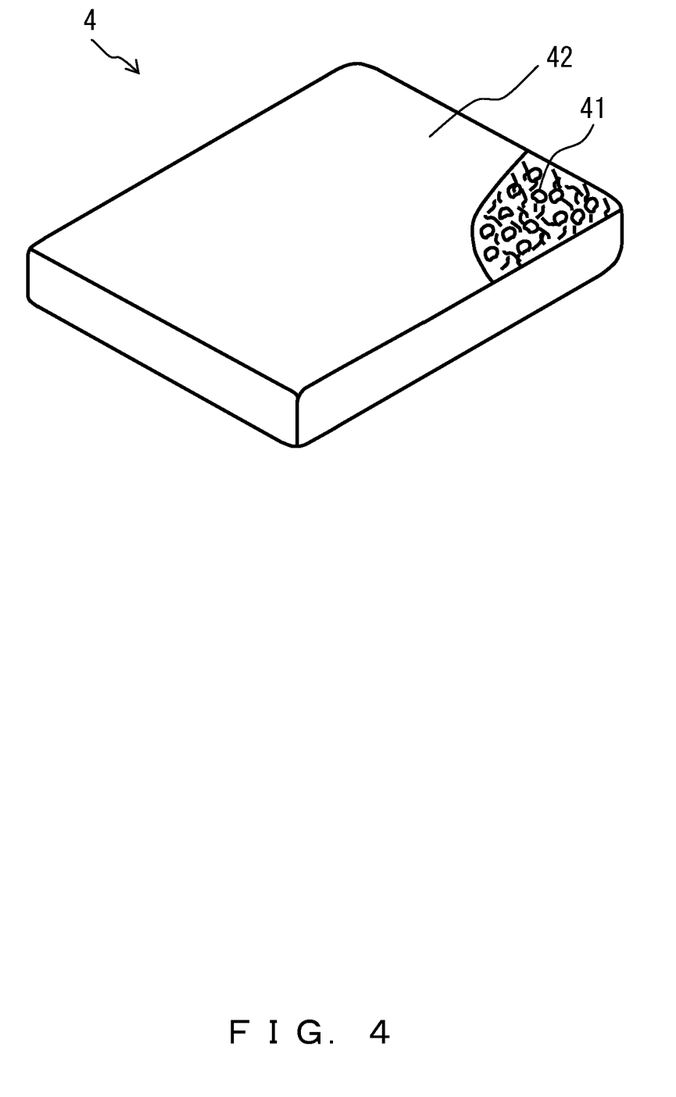
FIG. 4 illustrates the plant growing soil for growing plants including the radioactive-substance-absorbent.

FIG. 4 illustrates the plant growing soil for growing plants including the radioactive-substance-absorbent 1.

In FIG. 4, a radioactive-substance-absorbing turf bed 4 encloses plant growing soil 41 for growth of plants in a bag unit 42 of nonwoven fabric or in fiber form having water permeability and water flow in a specified size as a compressed mat. The plant growing soil 41 is obtained by mixing one or two, or more of any of an inorganic compound, an organic compound, silver, copper, ultramarine blue, and adding starch adhesive of corn starches etc.

Figure 5:
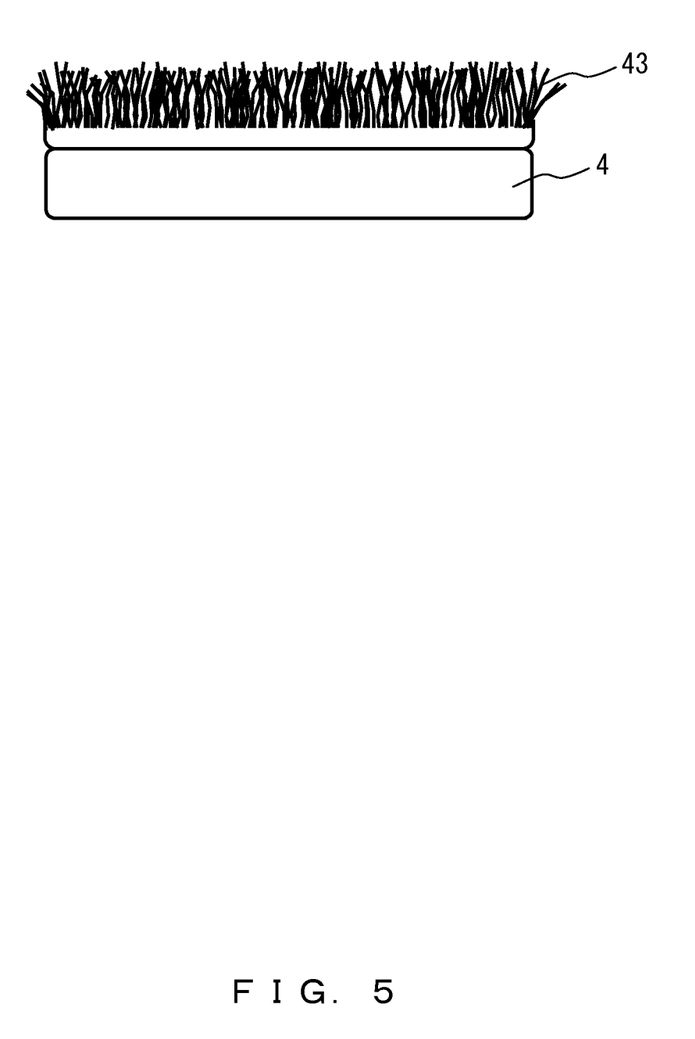
FIG. 5 is a turf mat using plant growing soil including the radioactive-substance-absorbent.

FIG. 5 is a turf mat using the plant growing soil 4 including the radioactive-substance-absorbent 1.

As illustrated in FIG. 5, a turf mat may be generated by fixing a turf 43 on the surface of the radioactive-substance-absorbing turf bed 4 described above with reference to FIG. 4. By arranging the generated turf mat on a large area of contaminated soil, a park such as the Yamashita Part after the Great Kanto Earthquake may be generated in a contaminated area.

Described next is an example of using contaminated sea water, river water, ground water, waste reclaimed land seeping water, sewage treated water, domestic waste water, industrial waste, water supply to contaminated water, etc.

Figure 6:
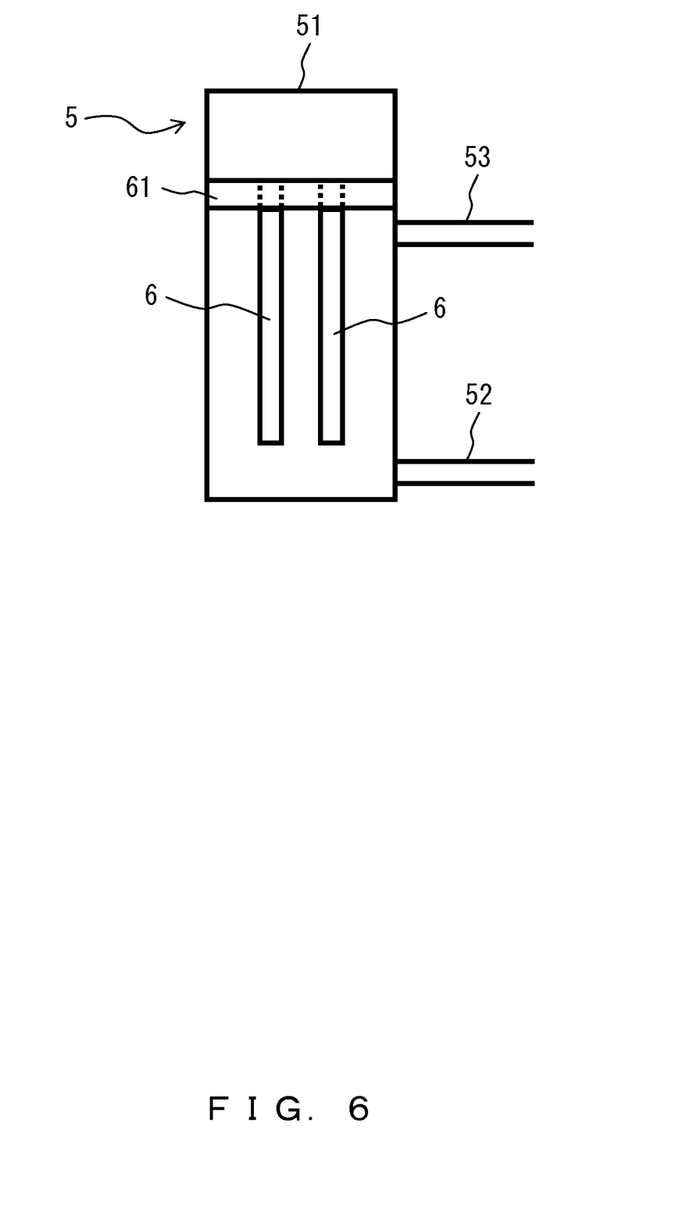
FIG. 6 is an example of using the radioactive substance absorbing filter including the radioactive-substance-absorbent.

FIG. 6 is an example of using the radioactive substance absorbing filter including the radioactive-substance-absorbent.

In FIG. 6, a radioactive substance filter 5 includes a filter tank 51 as a container, and a radioactive substance absorbing filter 6 is provided in the filter tank 51. At the bottom part of the filter tank 51, a processed fluid intake line 52 into which contaminated sea water etc. as processed fluid enters is connected. At the upper part of the filter tank 51, a radioactive substance absorbing filter 6 collects radioactive substances, and a processing fluid outlet line 53 for flowing removed processed fluid is connected. The processed fluid intake line 52 is, for example, a water supply line connected to the sea water pump for pumping up contaminated sea water from the sea.

The radioactive substance absorbing filter 6 is configured by storing the radioactive-substance-absorbent 1 which is bagged as described above with reference to FIG. 1 in a reticulated container formed by a petroleum resin including a hydroxyl group resistant to corrosion from seawater. The radioactive substance absorbing filter 6 is provided at the upper part in the filter tank 51 by being held at one end by a suppression unit 61. The radioactive substance absorbing filter 6 has a function as a partition between the processed fluid and the processing fluid.

Described next if the operation of the radioactive substance absorbing filter 6.

For example, after the impurities such as dust etc. are removed from the sea water as the processed fluid pumped up from the sea by a sea water pump by roughly filtering the sea water, the processed fluid enters the filter tank 51 through the processed fluid intake line 52. In the filter tank 51, the radioactive substances dissolved in the sea water etc. is collected and removed by the radioactive substance absorbing filter 6. After removing the radioactive substances, the processed fluid is released from the upper part of the filter tank 51 through the processing fluid outlet line 53.

With the above-mentioned radioactive substances filter 5, the radioactive substance absorbing filter 6 for collecting and removing radioactive substances is provided in the filter tank 51, and passes sea water etc. through the radioactive substance absorbing filter 6, thereby removing without fail the radioactive substances included in the sea water etc.

Described next is the bag unit for storing the above-mentioned radioactive-substance-absorbent 1 or the dry-type radioactive-substance-absorbent described above.

Figure 7:
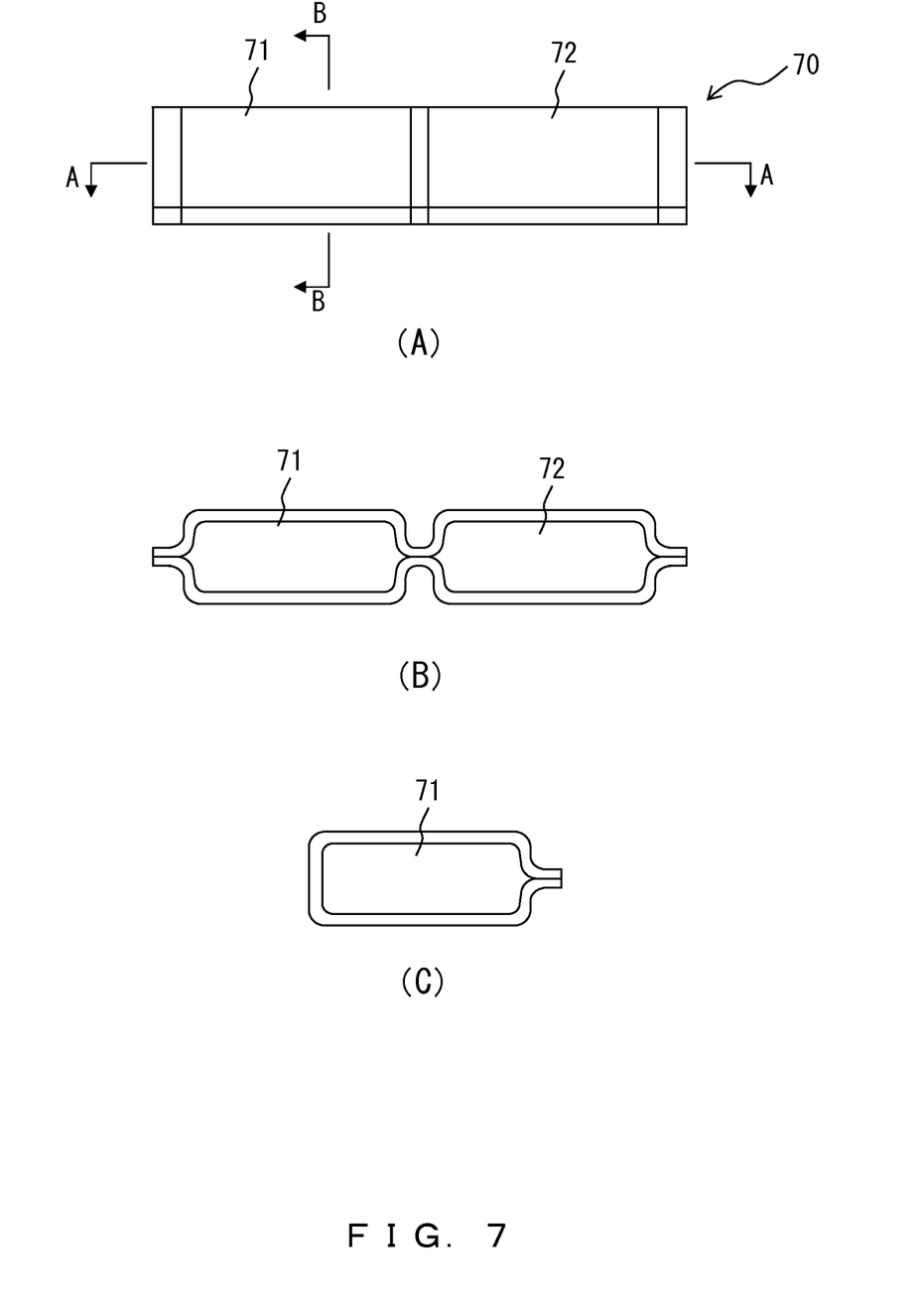
FIG. 7 is a bag unit storing the radioactive-substance-absorbent.

FIG. 7 is a bag unit storing the radioactive-substance-absorbent. Part (A) of FIG. 7 is a plan view, part (B) of FIG. 7 is an A-A sectional view, and part (C) of FIG. 7 is a B-B sectional view.

In FIG. 7, a bag unit 70 is, for example, forms a plurality of storage spaces including a first storage unit 71 and a second storage unit 72 independent from each other and connected to each other by laying two sheets by folding a nonwoven fabric or in fiber form in half, and adhering or sewing the periphery portion or a fiber form sheet. Then, the first storage unit 71 or the second storage unit 72 store the radioactive-substance-absorbent 1 or the dry-type radioactive-substance-absorbent described later.

The above-mentioned bag unit 70 may be easily folded at the connection part of the first storage unit 71 and the second storage unit 72. Therefore, after collecting radioactive substances etc. the bag unit 70 may be easily stored in a metal bag of zinc, aluminum, etc., and the bag unit 70 as collecting the radioactive substances etc.

The above-mentioned bag unit 70 may be separated in half at the connection point between the first storage unit 71 and the second storage unit 72. By the separation, the bag may be easily transported or stored after collecting radioactive substances etc.

The dry-type radioactive-substance-absorbent stored in the first storage unit 71 and second storage unit 72 is obtained by fibrillating paper, pulp, wood, bamboo, hemp, grass, and seed husk or a mixture of them as water permeable polymeric substance into fiber form, obtaining fibrillated cellulose, and mixing them with granulated inorganic porous crystal. The dry-type radioactive substances is not humidified by water unlike the radioactive-substance-absorbent 1. That is, the dry-type radioactive-substance-absorbent is obtained by skipping the water supplying step in step S302 from the producing step of the radioactive-substance-absorbent 1 described above with reference to FIG. 3. However, the dry-type radioactive-substance-absorbent is humidified in the use form described later.

Figure 8:
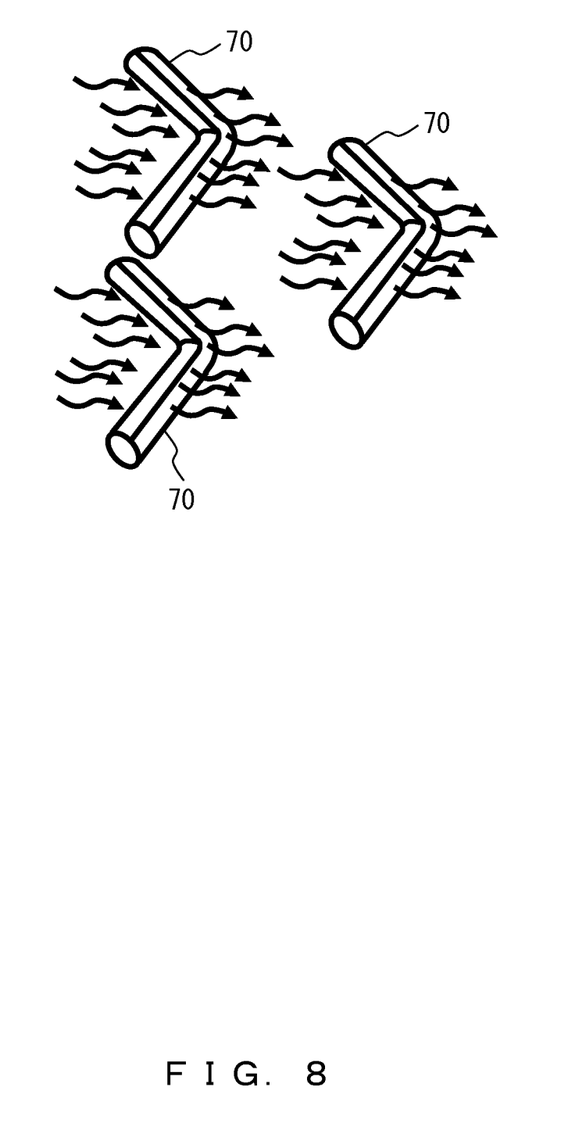
FIG. 8 is an example 1 of using the radioactive-substance-absorbent stored in the bag unit.

FIG. 8 is an example 1 of using the radioactive-substance-absorbent stored in the bag unit.

As illustrated in FIG. 8, the bag unit 70 in which the radioactive-substance-absorbent 1 or the dry-type radioactive-substance-absorbent is stored in the first storage unit 71 and the second storage unit 72 is arranged at the place where a fluid which have been contaminated or which may have been contaminated passes. Since the bag-shaped storage space of the bag unit 70 is independent in the first storage unit 71 and the second storage unit 72, the bag may be easily folded at the connection point although the radioactive-substance-absorbent 1 or the dry-type radioactive-substance-absorbent is separately stored. Therefore, as illustrated in FIG. 8, the bag unit 70 is not flown away by a passing fluid by folding the bag at the connection point in substantially "L"-shaped form, thereby easily collecting and removing radioactive substances etc. Thus, a fluid including a large amount of radioactive substances etc. may be prevented from being passed downstream.

Figure 9:
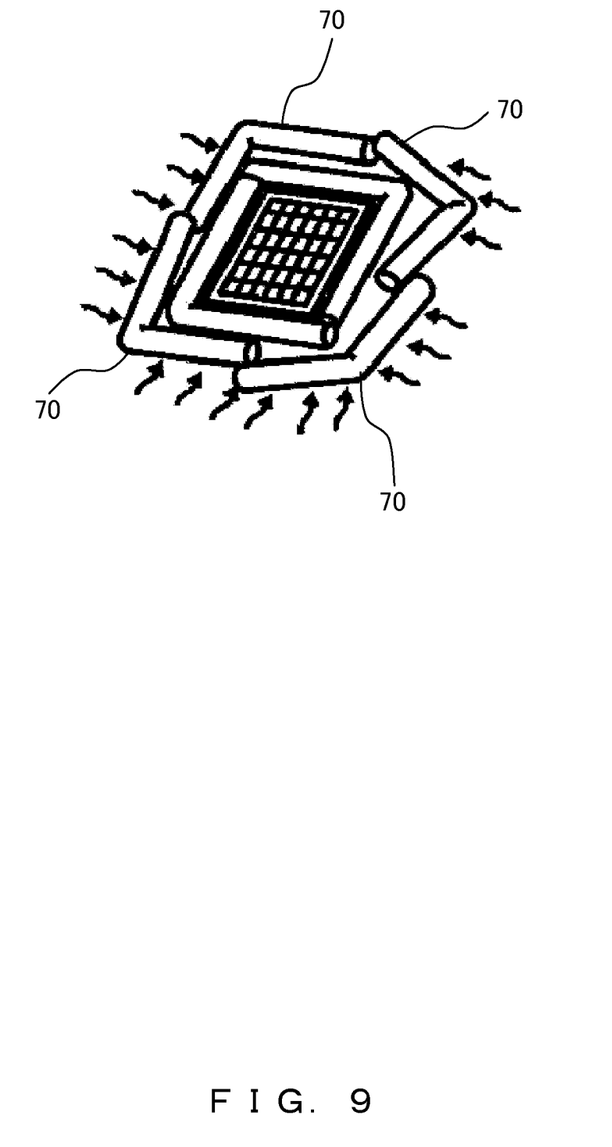
FIG. 9 is an example 2 of using the radioactive-substance-absorbent stored in the bag unit.

FIG. 9 is an example 2 of using the radioactive-substance-absorbent stored in the bag unit.

As illustrated in FIG. 9, a fluid may be prevented from entering the drain by collecting and removing radioactive substances etc. before the fluid entering the inside of the drain by providing the bag unit 70 around the drain etc. with the bag unit 70 bent in "L"-shaped form.

Figure 10:
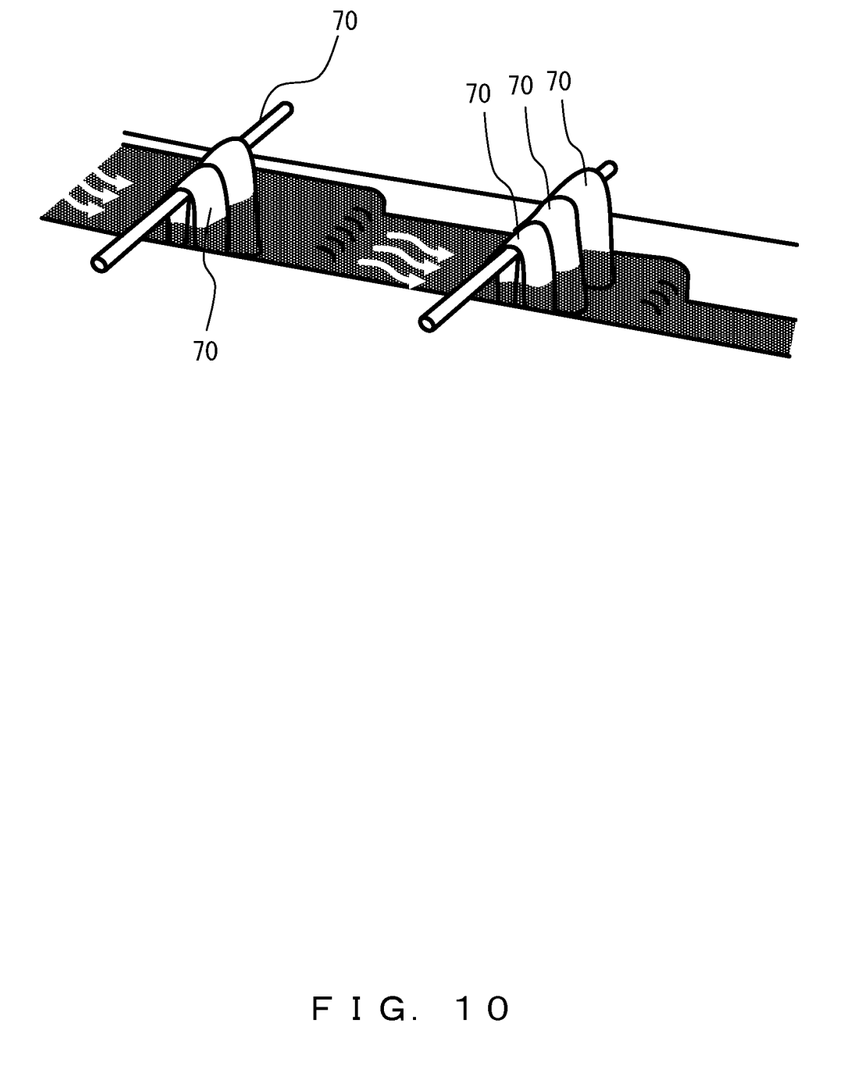
FIG. 10 is an example 3 of using the radioactive-substance-absorbent stored in the bag unit.

FIG. 10 is an example 3 of using the radioactive-substance-absorbent stored in the bag unit.

As illustrated in FIG. 10, in the case in which there is a large amount of fluid which indicates a high possibility that the fluid have been contaminated by radioactive substances etc., for example, when the fluid passes through the side drain, the bag unit 70 is bent at the connection point and suspended on a pole, a hanger, etc., thereby easily collecting and removing the radioactive substances etc. without flowing away the bag unit 70 by the flowing fluid.

Figure 11:
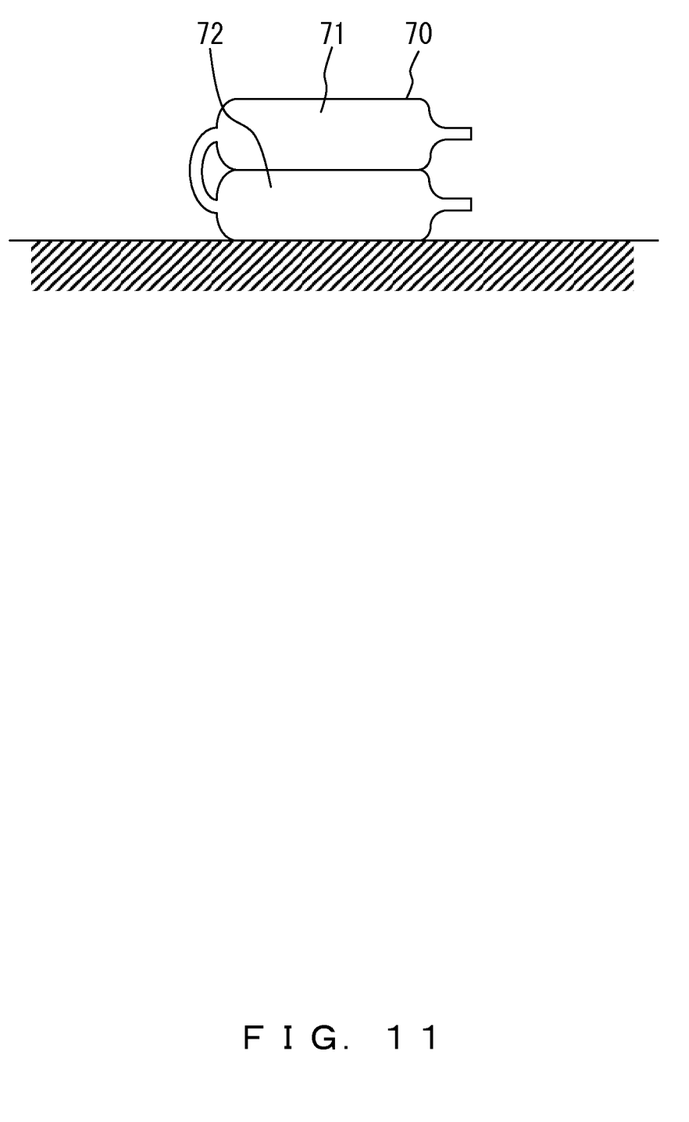
FIG. 11 is an example 4 of using the radioactive-substance-absorbent stored in the bag unit.

FIG. 11 is an example 4 of using the radioactive-substance-absorbent stored in the bag unit.

As illustrated in FIG. 11, the bag unit 70 storing the radioactive-substance-absorbent 1 or the dry-type radioactive-substance-absorbent in the first storage unit 71 and the second storage unit 72 is folded in half at the connection point of the first storage unit 71 and the second storage unit 72 may be used as a sandbag for damming the fluid. With the application, radioactive substances etc. may be collected and removed, and the flow of a fluid which contains or may contain radioactive substances etc. may be stopped or changed in direction.

The above-mentioned embodiments of the present invention have been described with reference to the attached drawings, but the present invention is not limited to the embodiments described above, and may be configured in any variations or forms in the scope of the gist of the present invention.

In place of zeolite, for example, smectite, vermiculite, iron group mineral, carbide, layered duplex hydroxide, and ultramarine blue may be used.

In addition, in place of the turf, sunflower, kenaf, quinoa, amaranthus, sorghum, kivi, stonecrop, lippia nodiflora may be used According to the present invention, radioactive substances released or spilled by an accident in a nuclear facility etc. may be efficiently and easily collected and removed at a low cost.

In addition, since used paper etc. of botanical origin may be used as a water permeable polymeric substance, a large amount of released or spilled radioactive substances may be collected and removed without destroying natural environments.

Furthermore, the method of processing collected garbages after adsorbing radioactive substances according to the present invention may be performed because the waste is enclosed by nonwoven fabric bas etc.

Additionally, according to the present invention, a collected substance may be incinerated in an incinerator, and the remaining waste is reduced into about 5%. Therefore, the amount of storage of very dangerous radioactive substances may be considerably reduced.

That is, the present invention has an outstanding effect as compared with the method of removing the surface of sand and earth, chipping wood and grass, scraping concrete or asphalt, etc. which discard a large amount of non-contaminated substances.

What is claimed is:

1. A radioactive-substance-absorbent obtained by fibrillation into fiber form and mixture of a humidified water permeable polymeric substance of botanical origin with a granulated inorganic porous crystal.

2. The radioactive-substance-absorbent according to claim 1, wherein
the water permeable polymeric substance comprises one or two, or more of mixtures of any of paper, pulp, wood, bamboo, hemp, grass, and seed husk.

3. The radioactive-substance-absorbent according to claim 1, wherein
the inorganic porous crystal is zeolite having an ion-exchange function.

4. The radioactive-substance-absorbent according to claim 1, wherein
a weight ratio among the water permeable polymeric substance, water, and the inorganic porous crystal is about 10:9:1.

5. The radioactive-substance-absorbent according to claim 1, wherein
a mixture of one or two, or more of any of inorganic compound, organic compound, silver, copper, and ultramarine blue is mixed, and starched is mixed as an adhesive.

6. A radioactive substance absorbing filter which decontaminates foods by submerging the foods in a water container after putting in a bag the radioactive-substance-absorbent described in claim 1.

7. Plant growing soil for growing plants including the radioactive-substance-absorbent according to claim 5.

8. A radioactive substance absorbing filter configured by putting the radioactive-substance-absorbent according to claim 1 in a reticulated container formed by petroleum resin including a hydroxyl group resistant to corrosion from seawater.

9. A bag unit comprises two or more connected bag-shaped storage units, wherein
each of the storage units stores a water permeable polymeric substance of botanical origin which is fibrillated in fiber form and a dry-type radioactive-substance-absorbent mixed with a granulated inorganic porous crystal.

10. The bag unit according to claim 9, wherein
the water permeable polymeric substance includes one or two, or more mixtures of any of paper, pulp, wood, bamboo, hemp, grass, and seed husk.

11. The bag unit according to claim 9, wherein
the inorganic porous crystal is zeolite having an ion-exchange function.

12. The bag unit according to claim 9, wherein
a weight percentage is 10:1 between the water permeable polymeric substance and the inorganic porous crystal.

13. The bag unit according to claim 9, wherein
each of the storage units may be separate from each other.

14. The bag unit, comprising
two or more connected storage units, wherein
each of the storage unit stores the radioactive-substance-absorbent according to claim 1.

* * * * *